United States Patent
Cines

[15] 3,692,890
[45] Sept. 19, 1972

[54] STOMP FOOT HAVING POROUS FACE
[72] Inventor: Martin R. Cines, Bartlesville, Okla.
[73] Assignee: Phillips Petroleum Company
[22] Filed: Nov. 13, 1969
[21] Appl. No.: 876,495

[52] U.S. Cl.............................................264/98, 18/5
[51] Int. Cl.....................................................B29c 17/07
[58] Field of Search..264/94, 98, 99; 18/5 BA, 5 BH, 18/5 BQ

[56] References Cited

UNITED STATES PATENTS

| 3,170,970 | 2/1965 | Adams | 264/97 X |
| 3,191,225 | 6/1965 | Polka | 264/97 UX |
| 3,278,665 | 10/1966 | Harrison | 264/328 X |
| 3,288,898 | 11/1966 | West | 264/97 UX |
| 3,382,532 | 5/1968 | Schweigler | 264/94 X |
| 3,499,188 | 3/1970 | Johnson | 18/19 H |

Primary Examiner—Robert F. White
Assistant Examiner—T. J. Carvis
Attorney—Young and Quigg

[57] ABSTRACT

A closed off end of a tubular thermoplastic parison is pressed against a back-up surface by means of a stomp foot having a porous face through which gaseous fluid is passed.

10 Claims, 5 Drawing Figures

PATENTED SEP 19 1972 3,692,890
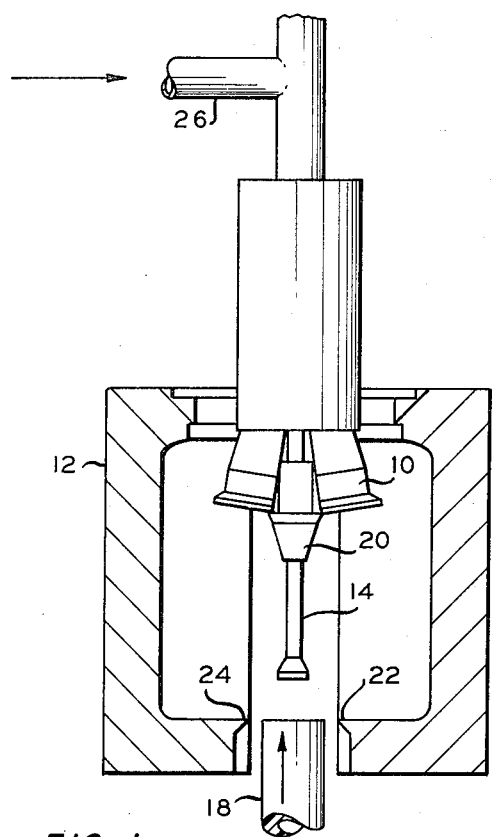
FIG. 1
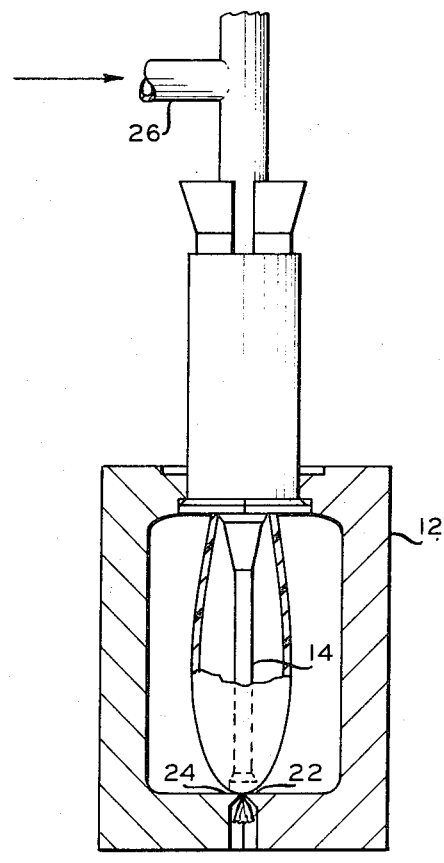
FIG. 2
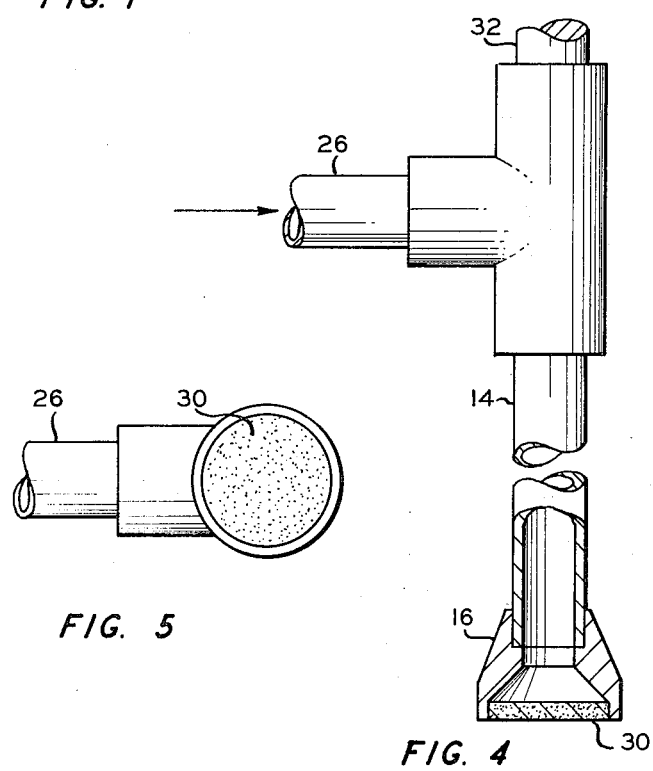
FIG. 5
FIG. 4
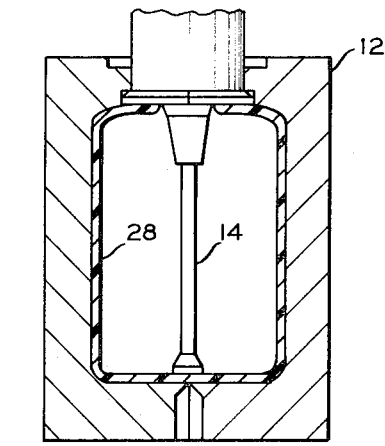
FIG. 3
INVENTOR.
M. R. CINES
BY
Young & Quigg
ATTORNEYS

STOMP FOOT HAVING POROUS FACE

BACKGROUND OF THE INVENTION

This invention relates to molding hollow articles from thermoplastic parison preforms.

While the blow molding art goes back over 100 years, it has only been in the last dozen years that blow molding of hollow plastic articles has achieved significant commercial success. With this expanded utilization of blow molding techniques has come ever more rigorous requirements from the purchasers of the finished product with regard to the appearance, durability, chemical resistance, low cost and the like, of the product.

It is a well-known fact that many polymers which are particularly suitable for blow molding such as the olefin polymers, undergo the phenomenon known as orientation when stretched in the solid state at a temperature just below their crystalline melting point. Since this orientation can result in as much as a 20-fold increase in tensile strength, it can be seen that it is desirable to utilize this phenomenon in the production of blow molded hollow articles such as bottles. Since the greatest orientation occurs at a temperature just below the crystalline melting point while the polymer is on a heating cycle and in a partially crystalline state, little orientation can be effected in a conventional blow molding operation wherein a molten parison is extruded between mold halves and blown. Thus, for the most part, any efforts to utilize this phenomenon in the production of blow molded articles requires the use of a parison preform which can be stored after its initial fabrication until such time as it is reheated to orientation temperature and fabricated.

Because of the competitive nature of the blow molding art, it is essential as a practical matter that the parison preforms be formed as economically as possible. Because of the inherent low cost of extrusion as compared with injection molding techniques, the simplest apparent method of forming parison preforms is to simply extrude a continuous length of tube and thereafter cut it into individual parisons of the desired length. However, this necessitates the sealing of one end of the parison and the temperature at which orientation occurs is far below the normal temperature at which fusion seals are generally considered possible. A basic patent in this area in Turner et al., U.S. Pat. No. 3,390,426, the disclosure of which is incorporated herein by reference, which discloses the use of a stomp foot to press against a closed off end of a parison. While techniques such as are disclosed in Turner et al. make possible the formation of articles having exceptional strength in the sealed area, certain problems are still present. For one thing, the stomp foot tends to chill the polymer in the contact area; since the polymer is already at a temperature below that at which it is generally considered to be susceptible to sealing, it is apparent that additional chilling is undesirable. In addition, the restraining effect of the stomp foot tends to cause the polymer immediately thereunder to be retained as opposed to being uniformly stretched out during the blowing operation, with the result that the portion of the parison forming the peripheral edge of the bottom adjacent the side walls tends to be thinned out more than the bulk of the side walls and the very bottom of the article which represents the area which was under the stomp foot.

SUMMARY OF THE INVENTION

It is an object of this invention to provide improved apparatus for blow molding hollow articles from tubular parison preforms;

It is a further object of this invention to provide an improved process for blow molding hollow articles from tubular parison preforms; and It is yet a further object of this invention to provide biaxially oriented hollow articles from open end tubular parisons which articles have improved uniformity in wall thickness.

In accordance with this invention, the closed-off end of a tubular thermoplastic parison preform is pressed against a back-up surface by means of a stomp foot having a porous face through which gaseous fluid is passed.

Brief Description of the Drawings

In the drawings, forming a part hereof, wherein like reference characters denote like parts in the various views, FIG. 1 is a side elevation partially in section of a blow molding apparatus utilizing the stomp foot of the instant invention;

FIG. 2 is a view similar to FIG. 1 showing a later stage in the process;

FIG. 3 is a view similar to FIG. 2 showing a yet later stage in the process;

FIG. 4 is a cross-sectional view of the stomp foot and auxiliary equipment; and

FIG. 5 is a bottom view of the stomp foot.

DESCRIPTION OF THE PREFERRED EMBODIMENTS

The apparatus of this invention is applicable for the formation of biaxially molecularly oriented hollow thermoplastic articles such as bottles and other containers, toys, lampshades, and other molded products, and the like.

Any orientable thermoplastic resin can be used in the practice of this invention. Examples of suitable resins include polymers and copolymers of mono-1-olefins having two to eight carbon atoms per molecule, poly(vinyl chloride), polystyrene, and the like. Preferred materials are polymers and copolymers of ethylene, propylene, and 1-butene, with polypropylene being especially preferred. These polymers are extruded or molded into parison preforms and cooled. They are then heated to orientation temperature, which, in the case of the polymers of mono-1-olefins, is generally 1°–50°, preferably 5°–25° F, below their crystalline melting temperature, and oriented. The crystalline melting point can be determined by slowly heating a small sample on the heating stage of a polarizing microscope and recording the temperature at which the last birefringence disappears as the crystalline melting point.

Particularly suitable apparatus for utilizing the stomp foot of the instant invention is that shown in the Turner et al. reference referred to hereinabove.

The porous material comprising the face of the stomp foot can be any material having sufficient structural strength and having a mean pore diameter in the range of about 5–165, preferably 10–65, microns. Preferred porous material is sintered steel.

Gaseous fluid can be passed through the porous material at a rate of 400–10,000, preferably 1,000–4,000 cc/min/in$^2$.

Referring now to the Figures, particularly FIG. 1, there is shown a blow molding apparatus comprising parison gripping jaws 10 disposed between mold halves 12. Coaxially disposed relative to gripping jaws 10 which provide a means for grasping a parison is rod 14 carrying stomp foot 16. Hollow tubular parison 18 is moved axially up around stomp foot 16 and rod 14 as shown by the arrow so as to be gripped between jaws 10 and tapered plug 20. The mold halves then close to pinch shut an open end of parison 18 by means of forwardmost projections 22 and 24. Projections 22 and 24 act as blade members to seal and sever the parison and together cooperate to form a back-up means for the stomp foot. Pressure exerted against the closed-off end of the parison from the inside by means of stomp foot 16 aids in forming the seal.

Fluid introduced through conduit 26 passes out through the porous face of stomp foot 16 and serves the triple function of (1) providing a lubricating film between the face of the stomp foot and the inner surface of the parison, (2) cooling the stomp foot, and (3) preblowing the parison slightly, as shown in FIG. 2.

The provision of a lubricating film of fluid between the face of the stomp foot and the inner surface of the parison allows the parison material in this area to be thinned out on introduction of additional blow air so that more material is provided for the peripheral edges of the bottom wall of the finished article adjacent the side walls. This is partly the result of the physical effect of the lubricating film and partly because the presence of the film of fluid (such as air, which is a poor conductor of heat) prevents the metal stomping foot from chilling the parison material further. Otherwise, the metal stomping foot would simply trap the material directly thereunder and preclude it from being thinned out on blowing so that the portion of the finished article corresponding to that just under the stomper foot and the side walls of the finished article would each be relatively thick, whereas the material forming the peripheral area around the bottom adjacent the side walls would be thinned out excessively. Furthermore, it is not only advantageous that the thin film of fluid precludes the stomp foot from chilling the plastic so that the plastic can remain at as high a temperature as possible, but also the stomp foot is thus allowed to remain cooler which reduces its tendency to stick to the plastic. This is largely the result of the insulating effect of the fluid film although the physical cooling effect of the fluid has some effect too.

FIG. 3 shows the operation in a later stage wherein additional fluid pressure has been introduced, for instance through an annular opening between the rod 14 and plug 20, which annular opening is connected to a separate source of fluid pressure. As can be seen from FIG. 3, the wall thickness of the finished article 28 is essentially uniform throughout.

While the drawings show the parison being pinched shut by means of forward projecting elements 22 and 24 on the mold walls, it is also within the scope of the invention to pinch the parison shut by separate means, and thereafter transfer the parison to a mold zone.

In FIG. 4, there is shown in greater detail stomp foot 16 carried by rod 14. As can be seen, the face 30 of stomp foot 16 which contacts the inner surface of the parison is made of sintered stainless steel. Member 32 is connected to an air cylinder which is not shown, which air cylinder actuates the axial movement of rod 14 carrying stomp foot 16. Fluid such as air is introduced through line 26 and thence through the hollow portion of rod 14 where it then passes out through sintered steel face 30.

FIG. 5 is a bottom view of the stomp foot.

ILLUSTRATIVE EMBODIMENT

Propylene homopolymer having a density of 0.905 (ASTM D 1505–63T), a melt flow of 2 (ASTM D 1238–62T, Condition L), and a melting point of about 340° F is extruded into tubing having an outside diameter of 0.8-inch and a wall thickness of 0.150-inch. The tubing is then cooled to room temperature in a vacuum sizing and quenching chamber and cut into 7-inch lengths. These 7-inch lengths are then heated to a temperature of 320° F. A first end of one of the thus heated parisons is then placed in a thread-forming jaw such as is shown in FIG. 1 and mold halves closed to pinch shut a second end of the parison, and axial movement effected between the two ends of the parison to stretch same as shown in FIG. 2. Immediately after the second end of the parison is pinched shut, a stomp foot having ½-inch outside diameter with a 1/16-inch thick sintered stainless steel disc is lowered so as to press the thus closed-off end of the parison between said sintered disc and the bottom wall-forming surface of the mold. Air is supplied through a rod carrying the stomp foot so as to flow out through the sintered disc at a rate of about 2,000 cubic centimeters of air per minute for each square inch of surface area at a pressure differential across the disc of 20 psi. Thereafter, additional fluid pressure is introduced into the interior of the parison to form same into a 10-inch capacity oriented round bottle.

After completion of the blow molding step, the bottles are cut into sections and the wall thickness measured. The average wall thickness of the bottles in the mid-portion of the side wall is about 30 percent greater than the average thickness in the bottom corners at the junction of the side wall and the peripheral edges of the bottom.

In another series of runs, bottles were blown in an identical manner except that the face of the stomp foot was solid. The side walls of these bottles had about 100 percent greater thickness than the average thickness in the bottom corners at the junction of the periphery of the bottom wall and the side walls.

While this invention has been described in detail for the purpose of illustration, it is not to be construed as limited thereby but is intended to cover all changes and modifications within the spirit and scope thereof.

I claim:

1. In an apparatus for forming biaxially oriented hollow articles, the improvement which comprises in combination:

means to grasp a first end of a tubular parison;

an axially reciprocal rod coaxially disposed relative to said grasping means;

a stomp foot carried by said rod, said stomp foot having a face of porous material, said porous material having a mean pore diameter within the range of 5–165 microns;

means to close a second end of said parison;

back-up means disposed so that said closed second end of said parison can be pressed between said face and said back-up means; and means to pass gaseous fluid through said porous face.

2. Apparatus according to claim 1 wherein said average mean pore diameter is within the range of 10–65 microns.

3. Apparatus according to claim 1 wherein said porous material is sintered metal.

4. Apparatus according to claim 1 wherein said porous material is sintered steel.

5. Apparatus according to claim 1 wherein said back-up means and said means to close are a single means which comprises at least two blade means to pinch shut and sever said tubular parison.

6. A method for forming a biaxially oriented hollow article comprising:

forming an open end parison preform of a crystalline thermoplastic material;

cooling said parison preform to a temperature below the crystalline freezing point of said thermoplastic material;

reheating said parison preform to a temperature within the range of 1°–50° F below the crystalline melting point of said thermoplastic material;

closing off an open end of said parison preform and enclosing said preform in a mold;

applying pressure to said thus closed-off end of said parison preform from the inside to force said parison against a backup means, while simultaneously providing a lubricating film of gaseous fluid over the portion of the interior of said parison preform against which said pressure is applied; and introducing additional fluid pressure into the interior of said parison to finally blow it into conformity with said mold.

7. A method according to claim 6 wherein said gaseous fluid is provided at a flow rate of 400–10,000 cc/min/in$^2$.

8. A method according to claim 6 wherein said gaseous fluid is provided at a flow rate of 1,000–4,000 cc/min/in$^2$.

9. A method according to claim 6 wherein said gaseous fluid is air.

10. A method according to claim 6 wherein said thermoplastic material is a polymer of at least one mono-1-olefin having two-eight carbon atoms per molecule and said parison preform is reheated to a temperature of 5°–25 F below the crystalline melting point thereof.

* * * * *